(12) United States Patent
Magee

(10) Patent No.: US 8,737,395 B2
(45) Date of Patent: May 27, 2014

(54) METHOD FOR ACCESSING A NETWORK AND NETWORK ACCESS DEVICE

(75) Inventor: Anthony Magee, Leeds (GB)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 199 days.

(21) Appl. No.: 13/356,142

(22) Filed: Jan. 23, 2012

(65) Prior Publication Data
US 2013/0188634 A1 Jul. 25, 2013

(51) Int. Cl.
*H04L 12/28* (2006.01)

(52) U.S. Cl.
USPC ............................ 370/389; 370/392; 709/223

(58) Field of Classification Search
USPC .................. 370/389, 392, 395.1; 709/223
See application file for complete search history.

(56) References Cited

U.S. PATENT DOCUMENTS

| | | | |
|---|---|---|---|
| 8,000,327 B1 * | 8/2011 | Minei et al. .................. | 370/392 |
| 8,046,450 B1 * | 10/2011 | Schloss et al. ............... | 709/223 |
| 8,121,126 B1 * | 2/2012 | Moisand et al. .............. | 370/392 |
| 2004/0258069 A1 * | 12/2004 | Serbest et al. ............. | 370/395.1 |
| 2006/0080421 A1 * | 4/2006 | Hu ............................... | 709/223 |
| 2006/0187856 A1 * | 8/2006 | Booth et al. .................. | 370/254 |
| 2007/0047557 A1 | 3/2007 | Martini et al. | |
| 2008/0247406 A1 * | 10/2008 | Figueira et al. ............... | 370/401 |
| 2010/0008373 A1 * | 1/2010 | Xiao et al. .................... | 370/401 |
| 2010/0238837 A1 * | 9/2010 | Zheng .......................... | 370/254 |
| 2011/0182189 A1 * | 7/2011 | Martini et al. ................ | 370/248 |
| 2011/0228767 A1 * | 9/2011 | Singla et al. .................. | 370/389 |
| 2011/0274111 A1 * | 11/2011 | Narasappa et al. ........... | 370/392 |

FOREIGN PATENT DOCUMENTS

| | | |
|---|---|---|
| EP | 1686552 A1 | 8/2006 |
| EP | 2209260 A1 | 7/2010 |

OTHER PUBLICATIONS

ADVA AG Optical Networking, European Application No. 12152169.4, Extended European Search Report, May 14, 2012.
Kireeti, K., et al., MPLS-based Layers 2 VPNs, Network Working Group Internet Draft, Jun. 2001.
Rosen, E., et al., Provisioning, Auto-Discovery, and Signaling in Layer 2 Virtual Private Networks (L2VPNs), Internet Engineering Task Force (IETF), Jan. 2011.

* cited by examiner

*Primary Examiner* — Habte Mered
*Assistant Examiner* — Vincelas Louis
(74) *Attorney, Agent, or Firm* — Michael G. Johnston; Moore and Van Allen PLLC

(57) ABSTRACT

A method is described for accessing a virtual private network over a packet switched network. The method includes the steps of sending, by a provider edge router, network labeling information about data packet labels to a network access device using a layer 2 network protocol.

13 Claims, 3 Drawing Sheets

METHOD FOR ACCESSING A NETWORK AND NETWORK ACCESS DEVICE

FIELD OF THE INVENTION

The present invention relates to a method for accessing a network and a network access device.

BACKGROUND OF THE INVENTION

In MPLS networks, data packets are labelled with an MPLS header indicating the path over which the packet should traverse. Rather than looking up a packet route in the routing table using IP addresses, the MPLS-labelled packets are switched upon determining the contents of the MPLS label. In other words, addresses within the header of an IP data packet are only examined once to extract the destination (and possibly other attributes) of this packet. Then a label is generated which codes the respective tunnel to the extracted destination. On each subsequent hop through the network, only the label is evaluated to determine the next hop.

MPLS label bindings need to be distributed among each of the routers taking part in an MPLS network, so that each router will know which label is bound to which route. In order to do so automatically, typically layer 3 protocols like the Label Distribution Protocol (LDP), the Resource Reservation Protocol (RSVP) or the Border Gateway Protocol (BGP) are used to exchange label bindings among the network nodes. For static configuration models, labels will have to be distributed manually or via a Network Management System, both of which increase overheads within the network both in terms of equipment and signalling complexity. Deploying a control plane in an access network with an explosion of edge devices is acknowledged by many as a potential scaling problem.

SUMMARY OF THE INVENTION

It is an idea of the present invention to utilize a layer 2 signalling protocol when distributing label bindings of a virtual private network instead of layer 3 signalling protocols. This is especially useful for connecting customer edge devices as network segments to a provider's network. Particularly in the access part of the network, costly layer 3 functions can be avoided by signalling packet labels via a layer 2 protocol.

In one aspect, the invention thus provides a method for accessing a virtual private network over a packet switched network, the method comprising sending, by a provider edge router, network labelling information about data packet labels to a network access device using a layer 2 network protocol.

According to one embodiment of the method, the packet switched network is a Multi-Protocol Label Switching network. This offers the advantage to extend the MPLS network to layer 2 compatible network access devices that do not need any specific layer 3 functionality in the control plane.

According to one embodiment of the method, the virtual private network is a Virtual Private LAN Service network or a hierarchical Virtual Private LAN Service network. This offers the advantage of easier automated label provisioning for spoke interconnections in a spoke-and-hub topology of network access devices connected to a provider core network.

According to one embodiment of the method, the network access device is a multi-tenant unit switch or aggregation/grooming device which is connected to a plurality of customer edge devices. For limited topology access networks such as mobile backhaul base stations this process of interconnecting customer edge devices to a core backhaul network is advantageous since label switched networks offer an outstanding scalability.

According to one embodiment of the method, the packet switched network is a Provider Backbone Bridges network, and the data packet labels comprise service identifier values.

According to one embodiment of the method, the method further comprises before sending the network labelling information, sending, by the network access device, a network access request to the provider edge router using the layer 2 network protocol. In this way, the network access device may advantageously broadcast an initial configuration message shell with its general signalling requirements. That way, different legacy network access devices may be accommodated in the virtual private network seamlessly.

According to one embodiment of the method, the method further comprises sending, by the network access device, a configuration message to the provider edge router using the layer 2 network protocol, wherein the configuration message includes a confirmation about the received network labelling information, and checking, by the provider edge router, whether the network labelling information has been correctly received by the network access device. This procedure offers the advantage of a confirmation protocol to ensure the proper configuration of a newly established network access by the provider edge router, especially when using a layer 2 network protocol as signalling protocol that does not support a specific confirmation or receipt acknowledge signalling structure.

According to one embodiment of the method, the layer 2 network protocol is the link layer discovery protocol or the link layer discovery protocol with media endpoint discovery extension. The usage of these protocols is advantageous, since the protocols are standardized and support multiple levels of operation.

According to one embodiment of the method, sending the network labelling information comprises sending the network labelling information in a TLV message. Especially for the link layer discovery protocol this type of message is very useful, since it offers extensibility of the protocol to accommodate flexible network labelling information signalling.

In another aspect, the invention provides a network access device, comprising at least one first virtual switch port which is configured to be coupled to at least one customer edge device, and at least one second virtual switch port which is configured to be coupled to at least one provider edge router of a packet switched network, wherein the network access device is configured to receive, by a provider edge router coupled to the at least one second virtual switch port, network labelling information about data packet labels used in a virtual private network, which is established over the packet switched network device, using a layer 2 network protocol, and wherein the network access device is configured to establish a network access to the virtual private network for the at least one customer edge device based on the received network labelling information. Such a network access device has the advantage to only rely on layer 2 network protocols for signalling purposes of network labelling information and does not need to be equipped with complex layer 3 control plane functionality.

According to one embodiment of the network access device, the network access device is a multi-tenant unit switch or aggregation/grooming device, wherein the packet switched network is a Multi-Protocol Label Switching network, and wherein the virtual private network is a Virtual Private LAN Service network or a hierarchical Virtual Private LAN Service network.

According to one embodiment of the network access device, the layer 2 network protocol is the link layer discovery protocol or the link layer discovery protocol with media endpoint discovery extension.

In a further aspect, the invention provides a packet switched network, comprising a provider core network including a plurality of provider edge routers, at least one network access device according to an aspect of the invention which is coupled to at least one of the plurality of provider edge routers, and at least one customer edge device coupled to the network access device, wherein the network access device is configured to exchange network labelling information of a virtual private network over the packet switched network with the at least one provider edge router using the layer 2 network protocol.

According to one embodiment of the packet switched network, the packet switched network is a Multi-Protocol Label Switching network.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF THE EMBODIMENTS

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Virtual private networks (VPN) within the meaning of this application include any type of collection of physically connected network nodes that resemble a packet-switched network (PSN) and that may be connected by virtual point-to-point or point-to-multipoint connections, also known as pseudo-wires. Data in virtual private networks may be tunnelled through data link layer protocols over the network underlying the virtual private network. The networks used for virtual private networks (VPN) may rely for example on Multi-protocol label switching (MPLS), Pseudo-Wire Layer 2 Tunnelling Protocol (L2TP), Internet Protocol (IPv4, IPv6) or similar network topologies. The VPNs themselves may for example comprise Virtual Private LAN Service (VPLS), hierarchical Virtual Private LAN Service (H-VPLS), Virtual Leased Line (VLL), Virtual Private Wire Service (VPWS), Ethernet over MPLS (EoMPLS), Ethernet over Pseudo-Wire (EoPW), Provider Backbone Bridges (PBB) or similar virtual LAN services.

Packet labels within the meaning of this application include any type of information that can be tagged to data packets sent over the PSN and the content of which relates the respective packet to a predetermined VPN. The packet label may comprise information about a destination of the packet, a time to live of the packet, an indication of the hierarchical order of nested packet labels, an indication about the transmission priority of the packet and similar information.

Routers that read out the packet labels and perform according routing based may be label switch routers (LSR). Depending on their position within the network, they may be entry and/or exit nodes of the VPN, in which case they may be label edge routers (LER). Edge routers may be configured to push a packet label to an incoming packet and pop it off any outgoing packet. Edge routers that belong to the provider's network may be called provider edge routers (PER), in particular with respect to VPNs based on MPLS. LSRs need to be provided with label bindings, so that packets coming in and going out of the network can be routed with respect to the coded tunnel in the packet labels. The determination of the actual routes of a packet through the network may be based on the read packet labels, but may still be evaluated in the respective LSRs by performing a dynamic routing algorithm, such as BGP, Open Shortest Path First (OSPF) or Enhanced Interior Gateway Routing Protocol (EIGRP).

Figure 1:
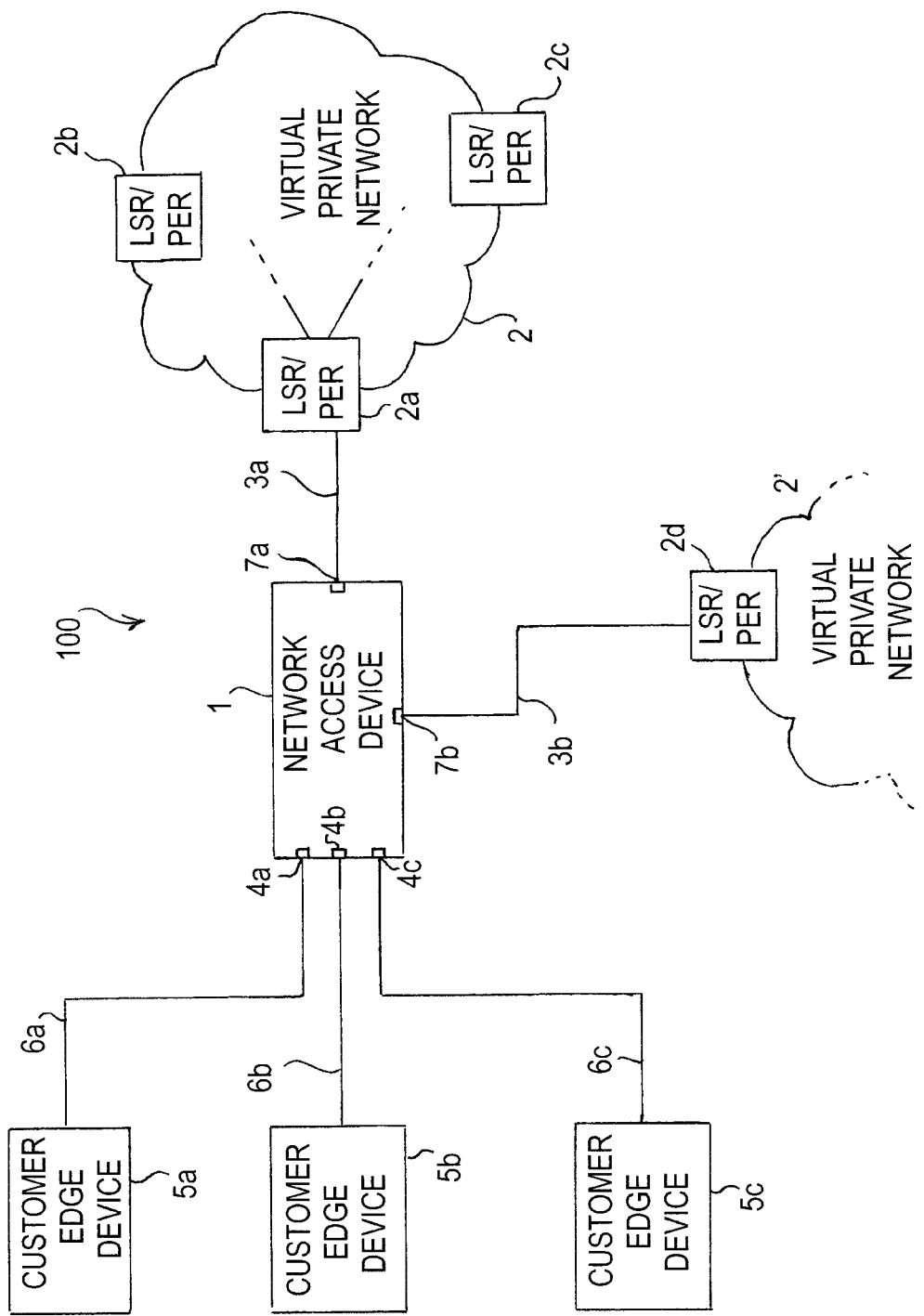
FIG. 1 schematically illustrates a network environment with a network access switch according to an embodiment.

FIG. 1 schematically illustrates a network environment 100 with a network access device 1. The network environment 100 may comprise one or more virtual private networks (VPN) 2, 2' which are established over a public switched network, such as an IP network, an Ethernet network or similar packet switched networks. In the following, with respect to the VPNs 2, 2' reference is exemplarily made to hierarchical Virtual Private LAN Service (H-VPLS) networks over a Multi-Protocol Label Switching (MPLS) network. However, it should be clear that any other type of VPN, such as a Virtual Local Area Network (VLAN), Virtual Private LAN Service (VPLS), or similar VPNs may be used in the network environment 100 as well. Analogously, other types of packet switched networks such as Provider Backbone Bridges (PBB) networks may be used in the network environment 100.

The VPN 2 may comprise a core network, which is usually denoted as provider network. Thus, the VPN 2, 2' may include a plurality of label switch routers (LSR) 2a, 2b, 2c, 2d which are configured to route data packets through the network. The LSRs may be configured as provider edge routers (PER) when they are located at the boundaries of the VPN 2, 2'. When an unlabelled data packet enters the VPN 2, 2' at a PER 2a, 2b, 2c, 2d, the PER 2a, 2b, 2c, 2d determines the destination and possibly other attributes like the priority of the of the data packet and inserts a label in an MPLS header that gets affixed to the data packet. The PER 2a, 2b, 2c, 2d passes the labelled packet to the next hop LSR for the respectively labelled tunnel.

When an LSR receives a labelled packet, the MPLS header is examined in order to determine the MPLS label. Based on the contents of the label different operations may be performed on the packet's label stack. LSRs may for example include lookup tables with network labelling information stored therein, so that the contents of the lookup tables may be used to process the data packet according to a comparison with the determined MPLS label.

For example, in a "push" operation, a new label may be "pushed" on top of the existing label, effectively "encapsulating" the packet in another layer of MPLS. This may allow for hierarchical routing of data packets, for example in H-VPLS. In a "pop" operation, the label may be removed from the data packet, the so called "decapsulation". If the popped label was the last on the label stack, the data packet may have arrived at its final destination or may exit the MPLS network at a different PER 2a, 2b, 2c, 2d.

The actual contents of the data packet do not need to be read out after the first labelling of the data packet, so that LSRs on the route of the data packet may process MPLS data packets much faster than conventional data packets. In particular, MPLS routing is independent of the actual data transfer protocol, since protocol-dependent routing tables are not necessary. Within the VPN 2, each participating node will need to have network labelling information about every other participating node, for example every PER 2a, 2b, 2c, 2d, every LSR and particularly every network access device 1 of access networks with customer edge devices 5a, 5b, 5c. The network labelling information may include information about the labels of each of the participating nodes and may serve as indicator for destinations of VPN tunnels encoded in data packet labels as used in the VPN 2.

A network access device 1 that tries to get access to the VPN 2 may be connected to one or more PERs 2a, 2d. For example, the network access device 1, which may be a multi-tenant unit switch, may be connected via a virtual switch port 7a over the connection 3a with the PER 2a of the VPN 2. The network access device 1 thus forms part of an access network for customer edge devices 5a, 5b, 5c. Exemplarily, three customer edge devices 5a, 5b, 5c are shown in FIG. 1 which are coupled via connections 6a, 6b, 6c, for example Ethernet connections 6a, 6b, 6c, to respective virtual switching ports 4a, 4b, 4c of the network access devices. In H-VPLS settings, the network access device 1 may be a multi-tenant unit switch MTU-s or aggregation/grooming device which aggregates multiple customer edge devices 5a, 5b, 5c into a single router device. The MTU-s 1 may in this case have a single label for communication with the PER 2a of the VPN 2 on a higher hierarchical level. On a lower hierarchical level, the access network segment comprising the MTU-s 1 and the customer edge devices 5a, 5b, 5c may be labelled on a lower encapsulation tier of the respective data packets.

For H-VPLS, the connection 3a may be a spoke interconnection to the VPN 2 which can be seen as hub. The spoke interconnection 3a may support a plurality of virtual connections to different VPNs. The network access device 1 may be connected to a different VPN 2' via a network connection 3b from the virtual switch port 7b to a PER 2d of the VPN 2'. It may be possible that the VPN 2' is identical to the VPN 2, in which case the PER 2d may be a redundant router to the PER 2a. The redundant PER 2d may be used to transmit and receive traffic from the VPN 2, 2', if the network connection 3a breaks down temporarily.

The network access device 1 does not need to have any conventional control plane functionality of the VPN 2, in particular no layer 3 network protocol functionality, like IP, TCP/UDP or LDP functionality. Instead, label signalling may be performed using a layer 2 network protocol the functionality of which may already be embedded in the network access device 1. The layer 2 network protocol that is used to exchange network labelling information may be the link layer discovery protocol (LLDP) or the link layer discovery protocol with media endpoint discovery extension (LLDP-MED). The communication over LLDP or LLDP-MED may be based on type-length-value (TLV) messages, that is, messages having a message type field, a message length field and a message value according to the length specified in the message length field. It should be obvious that other layer 2 network protocols, such as slow protocols, Operations, Administration and Maintenance protocol (OAM), GARP VLAN Registration Protocol (GVRP) or similar protocols.

Figure 2:
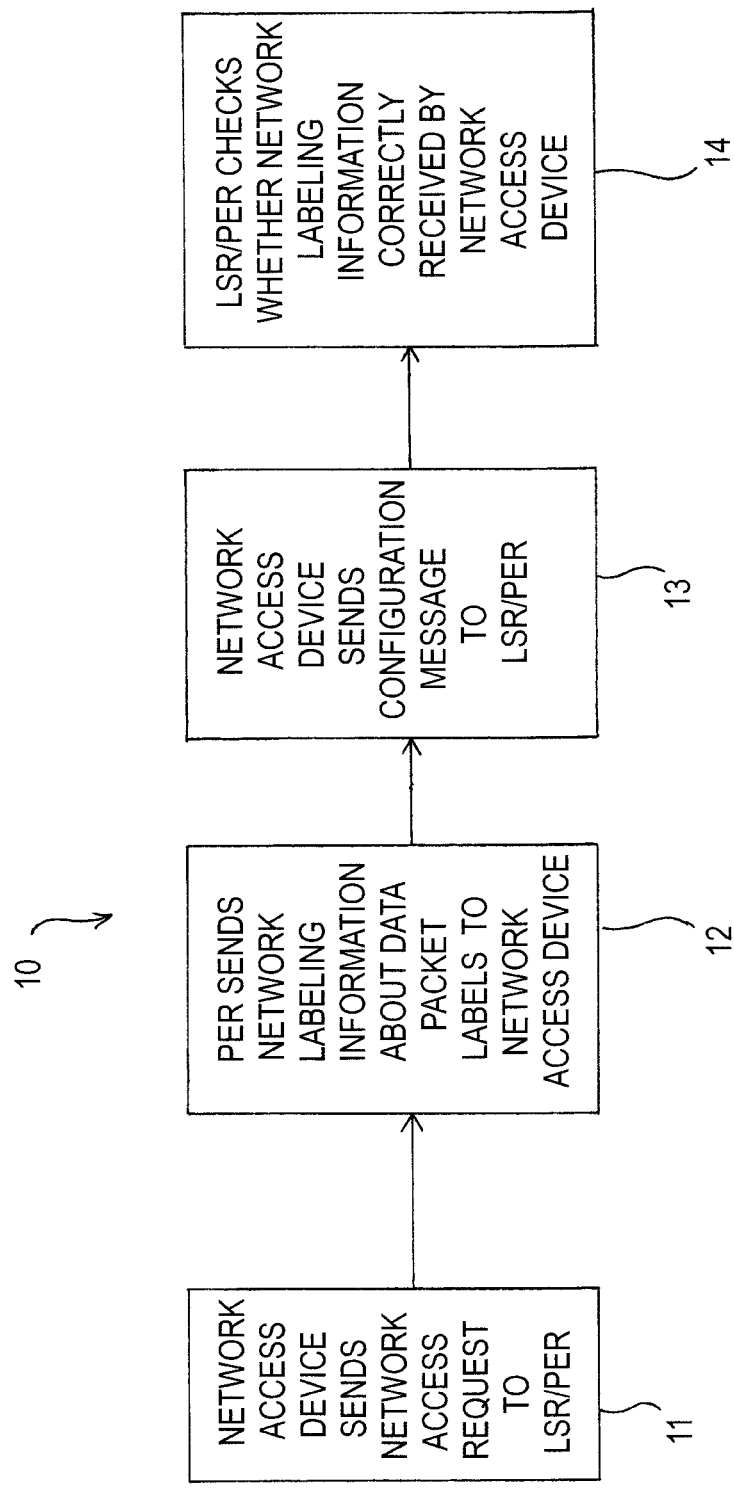
FIG. 2 schematically illustrates a method for accessing a virtual private network according to an embodiment.
Figure 3:
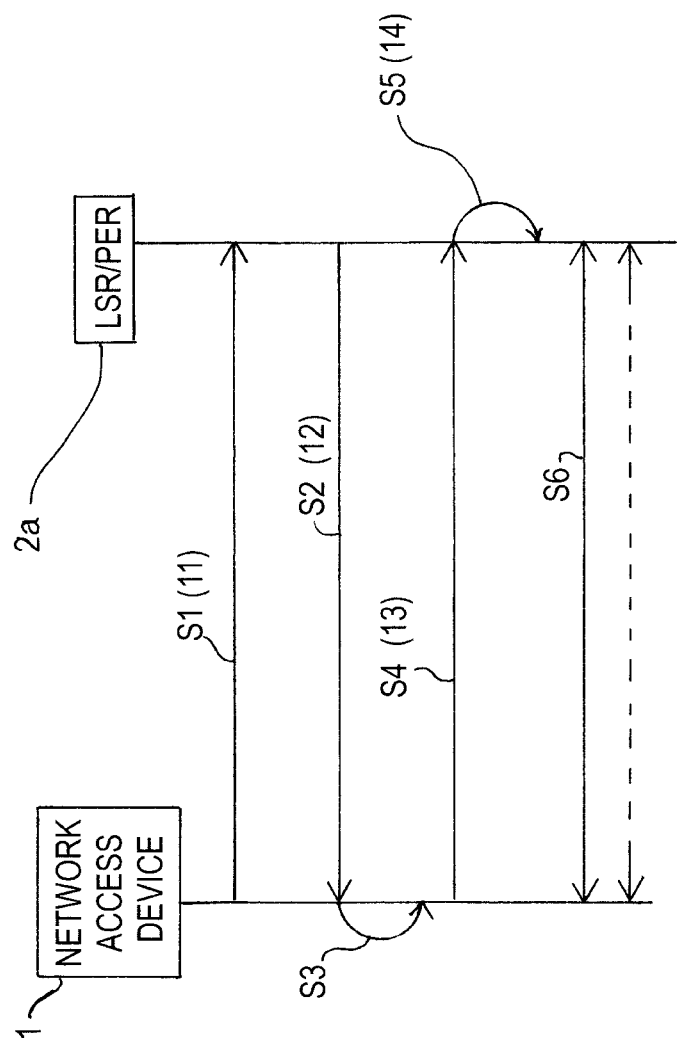
FIG. 3 schematically illustrates a flow diagram for initiating network access of a network access switch according to an embodiment.

FIG. 2 schematically illustrates a method 10 for accessing a virtual private network over a packet switched network. The method 10 may in particular be performed in a network environment 100 as depicted in FIG. 1. The method 10 will be described in conjunction with the signal flow diagram for the signalling flow between a network access device 1 and a PER 2a, as schematically illustrated in FIG. 3.

In a first optional step 11, the method 10 may comprise sending, by the network access device 1, a network access request to the provider edge router 2a using the layer 2 network protocol. This is depicted as signalling flow step S1 in FIG. 3. Since a layer 2 network protocol, such as for example LLDP or LLDP-MED, may be a one-way protocol, the network access device 1 may broadcast its configuration settings in predefined time periods. Therefore, if a PER 2a is in reach, the PER 2a may receive such a network access request. With this network access request, establishing a network access may be automated by the network access device 1.

Additionally, or within the network access request, the network access device 1 may send a message containing the current configuration status of the network access device 1. This message may also be empty, if there is currently no configuration available for the network access device 1. The network access device 1 may for example be configured to send such a configuration status message periodically.

A PER 2a in reach may receive these messages and evaluate the configuration of the network access device 1 according to a currently valid configuration. If there are any changes detected in the configuration necessary to grant access for the network access device 1 in the network, or if there is currently no configuration assigned to the network access device 1, the PER 2a may initiate a configuration routine as exemplarily illustrated in the following steps.

In a second step 12, the method 10 comprises sending, by the PER 2a, network labelling information about data packet labels to the network access device 1 using the layer 2 network protocol, such as LLDP or LLDP-MED. This step is depicted as signalling flow step S2 in FIG. 3. The network access request of step 11 may for example include a TLV message having an empty string in the value field, i.e. the TLV message comprising the network access request may be a blank message template. The PER 2a may use this blank message template and fill it with the respective label for the network access device 1. Alternatively, the PER 2a which may be responsible for configuring any link segments connected to its network edge may emit a network labelling information message by itself towards the access network. It may for example be possible to detect the presence of a link 3a by using the LLDP.

The string of the value field of the TLV message sent by the PER 2a may for example include a subtype field, a tunnel ID field, a technology field and a label value field. The subtype field may indicate the message subtype sent by the PER 2a, for example a message assigning network labelling information or a message confirming a previous correct labelling assignment. The tunnel ID field may be used to specify the VPN 2 which the respective labelling information belongs to, so that multiple tunnels may be established over the connection 3a. The technology field may include a value that indicates the type of VPN, for example S-VLAN, MPLS, PBB or other VPNs. The content of the label value field may vary according to the value specified in the technology field and may include, inter alia, MPLS label values for MPLS, VLAN IDs for S-VLAN, service identifiers I-SIDs for PBBs and possibly other values.

In a third step 13, the method 10 may comprise sending, by the network access device 1, a configuration message in flow step S4 to the PER 2a using the layer 2 network protocol, wherein the configuration message includes a confirmation about the received network labelling information. The network access device 1 may update its internal labelling information tables in a flow step S3 and prepare the access network according to the information received in step 12. The updating may involve configuring the used VPN technology, updating the correct spoke interface ID and which label values to use for the specific VPN communication channel.

Upon receipt of the configuration message, the PER 2a may check in a method step 14, whether the network labelling information has been correctly received by the network access device 1. This is depicted in flow step S5 in FIG. 3. If the network access device 1 has been configured correctly, the exchange of data packets as shown exemplarily in flow step S6 may commence, since the network access device 1 has established access to the VPN 2 for the customer edge devices 5a, 5b, 5c.

In the foregoing detailed description, various features are grouped together in one or more examples or examples for the purpose of streamlining the disclosure. This method of disclosure is not to be interpreted as reflecting an intention that the claimed examples of the invention require more features than are expressly recited in each claim. Rather, as the following claims reflect, inventive subject matter lies in less than all features of a single disclosed example. Thus the following claims are hereby incorporated into the detailed description as examples of the invention, with each claim standing on its own as a separate example. It is understood that the above description is intended to be illustrative, and not restrictive. It is intended to cover all alternatives, modifications and equivalents as may be included within the scope of the invention as defined in the appended claims. Many other examples will be apparent to one skilled in the art upon reviewing the above specification. The scope of the invention should, therefore, be determined with reference to the appended claims, along with the full scope of equivalents to which such claims are entitled. Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

I claim:

1. A method for accessing a virtual private network over a packet switched network, the method comprising:

sending, by a provider edge router, network labeling information about data packet labels to a network access device using a layer 2 network protocol;

sending, by the network access device, a configuration message to the provider edge router using the layer 2 network protocol, wherein the configuration message includes a confirmation about the received network labeling information; and checking, by the provider edge router, whether the network labeling information has been correctly received by the network access device.

2. The method according to claim 1, wherein the packet switched network is a Multi-Protocol Label Switching network.

3. The method according to claim 2, wherein the virtual private network is a Virtual Private LAN Service network or a hierarchical Virtual Private LAN Service network.

4. The method according to claim 2, wherein the network access device is a multi-tenant unit switch or aggregation/grooming device which is connected to a plurality of customer edge devices.

5. The method according to claim 1, wherein the packet switched network is a Provider Backbone Bridges network and wherein the data packet labels comprise service identifier values.

6. The method according to claim 1, further comprising:
before sending the network labeling information, sending, by the network access device, a network access request to the provider edge router using the layer 2 network protocol.

7. The method according to claim 1, wherein the layer 2 network protocol is a link layer discovery protocol or a link layer discovery protocol with media endpoint discovery extension.

8. The method according to claim 1, wherein sending the network labeling information comprises sending the network labeling information in a TLV message.

9. A network access device, comprising:
at least one first virtual switch port which is configured to be coupled to at least one customer edge device; and
at least one second virtual switch port which is configured to be coupled to at least one provider edge router of a packet switched network,
wherein the network access device is configured to receive, by said at least one provider edge router coupled to the at least one second virtual switch port, network labeling information about data packet labels used in a virtual private network, which is established over the packet switched network, using a layer 2 network protocol,
establish a network access to the virtual private network for the at least one customer edge device based on the received network labeling information,
send a configuration message to the provider edge router using the layer 2 network protocol, wherein the configuration message includes a confirmation about the received network labeling information, and
wherein said at least one provider edge router checking whether the network labeling information has been correctly received by the network access device.

10. The network access device according to claim 9, wherein the network access device is a multi-tenant unit switch or aggregation/grooming device, wherein the packet switched network is a Multi-Protocol Label Switching network, and wherein the virtual private network is a Virtual Private LAN Service network or a hierarchical Virtual Private LAN Service network.

11. The network access device according to claim 9, wherein the layer 2network protocol is a link layer discovery protocol or a link layer discovery protocol with media endpoint discovery extension.

12. A packet switched network, comprising:
- a provider core network including a plurality of provider edge routers;
- at least one network access device according to claim 9 coupled to at least one of the plurality of provider edge routers; and
- at least one customer edge device coupled to the network access device,
- wherein the network access device is configured to exchange network labeling information of a virtual private network over the packet switched network with the at least one provider edge router using the layer 2 network protocol.

13. The packet switched network according to claim 12, wherein the packet switched network is a Multi-Protocol Label Switching network.

\* \* \* \* \*